(12) United States Patent
Grams

(10) Patent No.: US 9,842,251 B2
(45) Date of Patent: Dec. 12, 2017

(54) BULLETED LISTS

(71) Applicant: Konica Minolta Laboratory U.S.A., Inc., San Mateo, CA (US)

(72) Inventor: Jason James Grams, Westminster, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 4 days.

(21) Appl. No.: 15/011,220

(22) Filed: Jan. 29, 2016

(65) Prior Publication Data

US 2017/0220859 A1     Aug. 3, 2017

(51) Int. Cl.
*G06K 9/48*     (2006.01)
*G06K 9/00*     (2006.01)
*G06T 7/00*     (2017.01)
*G06K 9/46*     (2006.01)

(52) U.S. Cl.
CPC ....... *G06K 9/00463* (2013.01); *G06K 9/4604* (2013.01); *G06T 7/0081* (2013.01); *G06T 7/0085* (2013.01); *G06K 2009/4666* (2013.01); *G06T 2207/20148* (2013.01); *G06T 2207/30176* (2013.01)

(58) Field of Classification Search
CPC ............... G06T 2207/30176; G06K 9/00442–2009/00489; G06F 17/2241; G06F 17/2705; G06F 17/2247; G06F 17/27

See application file for complete search history.

(56) References Cited

U.S. PATENT DOCUMENTS 7,295,708 B2   11/2007   Chen et al.
7,836,399 B2   11/2010   Gurcan et al.
2015/0095022 A1   4/2015   Xu et al.

FOREIGN PATENT DOCUMENTS

EP     1519280 A2     3/2005

OTHER PUBLICATIONS

Extended European Search Report issued in corresponding European Application No. 16199888.5 dated Jun. 9, 2017 (9 pages).

*Primary Examiner* — Brian P Werner
(74) *Attorney, Agent, or Firm* — Osha Liang LLP

(57) ABSTRACT

A method for image processing by: obtaining an original image including a bulleted list; determining a list bounding box enclosing the bulleted list; determining line bounding boxes nested within the list bounding box enclosing lines of the bulleted list; identifying bullets based on the line bounding boxes; identifying indentations based on the bullets; and generating a bulleted list object for the bulleted list in the original image based on the indentations.

17 Claims, 9 Drawing Sheets

Original Image
702

List Bounding Box
704

List Bounding Box 704

Line Bounding Boxes 706

Starting Intra-Line Bounding Box 710

Line Bounding Box 708

Intermediate Intra-Line Bounding Boxes 712

BULLETED LISTS

BACKGROUND

Bulleted lists are a very common way to represent sets of data. It is common, for example, to list line-items on a whiteboard during an organizational or planning meeting. If such information is needed in electronic form for archiving or later distribution (e.g., via email), it is useful to be able to create an electronic document from an image (e.g., photograph) of that whiteboard.

Character recognition technology is relatively widespread for converting such information into electronic form. However, simply recognizing the characters does not preserve the actual structure of the bulleted list. If the user wishes to modify the contents later (e.g., adding additional line-items, removing existing line-items, etc.), it will be necessary to first format the data into a list manually. This can be complicated by the fact that the text may be free-form, and separation between line items can be lost. Finally, if character recognition is unreliable (particularly an issue with hand-written text) images of text may be interspersed in the electronic text, or portions of text may be skipped. Regardless, users still wish to capture bulleted lists and convert them to electronic format.

SUMMARY

In general, in one aspect, the invention relates to a method for image processing. The method comprises: obtaining an original image comprising a bulleted list; determining a list bounding box enclosing the bulleted list; determining a plurality of line bounding boxes nested within the list bounding box enclosing a plurality of lines of the bulleted list; identifying a plurality of bullets based on the plurality of line bounding boxes; identifying a plurality of indentations based on the plurality of bullets; and generating a bulleted list object for the bulleted list in the original image based on the plurality of indentations.

In general, in one aspect, the invention relates to a non-transitory computer readable medium (CRM) storing computer readable program code embodied therein. The computer readable program code: obtains an original image comprising a bulleted list; determines a list bounding box enclosing the bulleted list; determines a plurality of line bounding boxes nested within the list bounding box enclosing a plurality of lines of the bulleted list; identifies a plurality of bullets based on the plurality of line bounding boxes; identifies a plurality of indentations based on the plurality of bullets; and generates a bulleted list object for the bulleted list in the original image based on the plurality of indentations.

In general, in one aspect, the invention relates to a system for image processing. The system comprises: a bounding box generator that: determines a list bounding box enclosing the bulleted list; and determines a plurality of line bounding boxes nested within the list bounding box enclosing a plurality of lines of the bulleted list; a bullet locator that identifies a plurality of bullets based on the plurality of line bounding boxes; an list hierarchy engine that identifies a plurality of indentations based on the plurality of bullets; and an list object generator that generates a bulleted list object for the bulleted list in the original image based on the plurality of indentations.

Other aspects of the invention will be apparent from the following description and the appended claims.

DETAILED DESCRIPTION

Figure 1:
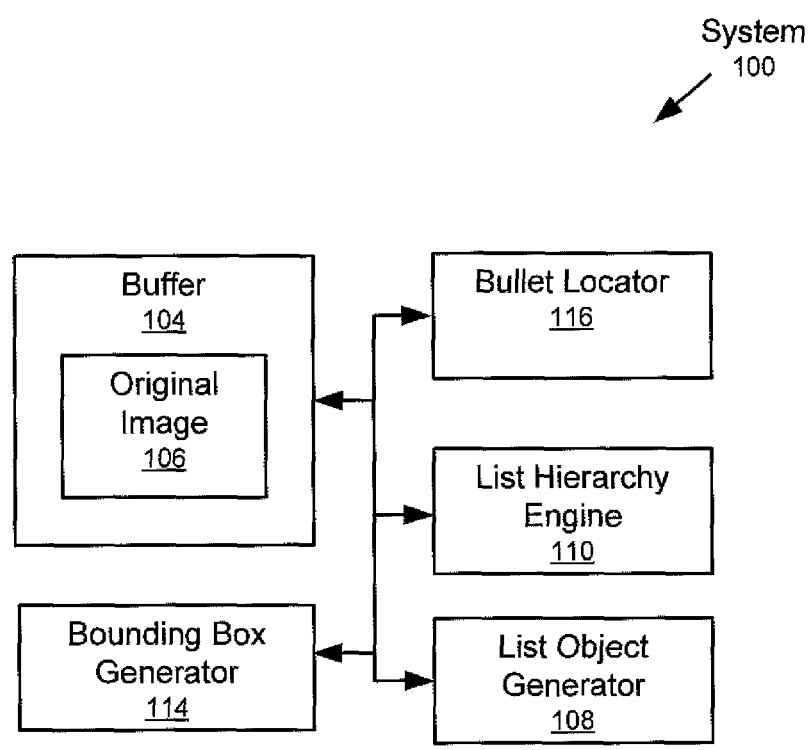
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. An original image including a bulleted list is obtained and a list bounding box enclosing the bulleted list is determined using a dilate and erode (DE) operation. Multiple line bounding boxes nested within the list bounding box are also determined. Within each line bounding box, a starting intra-line bounding box and one or more intermediate intra-line bounding boxes may be identified using a DE operation with more dilate iterations than erode iterations. A bullet may be identified within a line bounding box based on a dimension of the starting intra-line bounding box. Further, the indentations of the bulleted list, and thus the hierarchy of the bulleted list, are identified based on the horizontal positions of the identified bullets. Finally, a bulleted list object representing the bulleted list may be generated for inclusion in an electronic document (ED). The bulleted list object may be specified using tags having attributes defining the hierarchy (e.g., indentations) of the bulleted list and the content of the bulleted list (e.g., text characters).

FIG. 1 shows a system (100) in accordance with one or more embodiments of the invention. As shown in FIG. 1, the system (100) has multiple components including a buffer (104), a bounding box generator (114), a list hierarchy engine (110), a list object generator (108), and a bullet locator (116). Each of these components (104, 108, 110, 114, 116) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (104). The buffer (104) may be implemented in hardware (i.e., circuitry), software, or any combination thereof. The buffer (104) stores an original image (106) having one or more bulleted lists. The bulleted lists may be hand-drawn or machine printed. The original image (106) may be a scan of a hardcopy document. The original image (106) may be a digital photograph of a hardcopy document or whiteboard. Additionally or alternatively, the original image (106) may be downloaded from any source (e.g., website). Further, the original image (106) may be of any size and in any format (e.g., JPEG, GIF, BMP, etc.)

Those skilled in the art, having the benefit of this detailed description, will appreciate that a bulleted list is a list that uses a bullet (i.e., a symbol or glyph such as an asterisk, a hyphen, a numerical digit, a period, a filled circle, etc.) to introduce items of the list. Each item in the list may occupy one or more lines. A bulleted list may have a hierarchy, with different levels of the bulleted list using different types of bullets positioned at different indentations.

In one or more embodiments of the invention, the system (100) includes the bounding box generator (114). The bounding box generator (114) may be implemented in hardware (i.e., circuitry), software, or any combination thereof. The bounding box generator (114) is configured to determine a list bounding box for each bulleted list in the original image (106). A list bounding box is a rectangular perimeter that encloses a bulleted list. Accordingly, the list bounding box has a position (e.g., coordinates) and dimensions. In order to determine a list bounding box, the bounding box generator (114) may utilize gradients, a DE operation, and a contour threshold (discussed below).

In one or more embodiments of the invention, the bounding box generator (114) is configured to determine a line bounding box for each line of a bulleted list. A line bounding box is a rectangular perimeter that encloses a line of a bulleted list. Accordingly, each line bounding box has a position (e.g., coordinates) and dimensions. As there are multiple lines in a bulleted list, multiple line bounding boxes may be nested within a single list bounding box. In order to determine a line bounding box, the bounding box generator (114) may utilize gradients, a DE operation, and a contour threshold (discussed below).

In one or more embodiments of the invention, the system (100) includes the bullet locator (116). The bullet locator (116) may be implemented in hardware (i.e., circuitry), software, or any combination thereof. The bullet locator (116) is configured to identify a bullet in a line of the bulleted list. Specifically, the bullet locator (116) may first identify the starting intra-line bounding box and the one or more intermediate intra-line bounding boxes for each line bounding box. Identifying the intra-line bounding boxes may include using a blur function and a DE operation (discussed below). Then, the bullet locator (116) may identify a bullet based on a dimension of the starting intra-line bounding box and/or spacing between the starting intra-bounding box and the adjacent intermediate bounding box (also discussed below). As discussed above, a single item of the bulleted list may occupy multiple lines. Accordingly, some lines might not have bullets.

In one or more embodiments of the invention, the system (100) includes the list hierarchy engine (110). The list hierarchy engine (110) may be implemented in hardware (i.e., circuitry), software, or any combination thereof. The list hierarchy engine (110) is configured to identify the indentations of the bullets in the bulleted list and thus the hierarchy/levels of the bulleted list. As discussed above, a bulleted list may have a hierarchy, with different levels of the bulleted list positioned at different indentations. The list hierarchy engine (110) may use the horizontal positions of the starting intra-line bounding boxes to identify the indentations of the bullets. In one or more embodiments, the spacing engine (110) may consolidate (i.e., merge, combine, collapse, etc.) multiple horizontal positions that are within a predetermined distance of each other into a single indentation (discussed below).

In one or more embodiments of the invention, the system (100) includes the list object generator (110). The list object generator (110) may be implemented in hardware (i.e., circuitry), software, or any combination thereof. The list object generator (108) is configured to generate a bulleted list object representing the bulleted list. The bulleted list object may be generated for inclusion in an electronic document (ED) that is specified using a markup language (e.g., Office Open XML). Accordingly, the bulleted list object may be defined using tags with attributes set based on the text characters, bullets, indentations, hierarchy, etc. identified from the bulleted list in the original image (106). The bulleted list object preserves the structure of the bulleted list and also makes the bulleted list editable (e.g., add/remove items, lines, levels, etc.) by subsequent users.

Although FIG. 1 shows the system (100) as having five components (104, 108, 110, 114, 116), in other embodiments, the system (100) may have more or fewer components. For example, the system (100) may include a scanner or a smart phone with a digital camera to capture the original image (106). As another example, the system (100) may include addition engines to perform additional processing (e.g., OCR) on the original image (106) to extract the contents (e.g., text characters) in the lines of the bulleted list.

Figure 2:
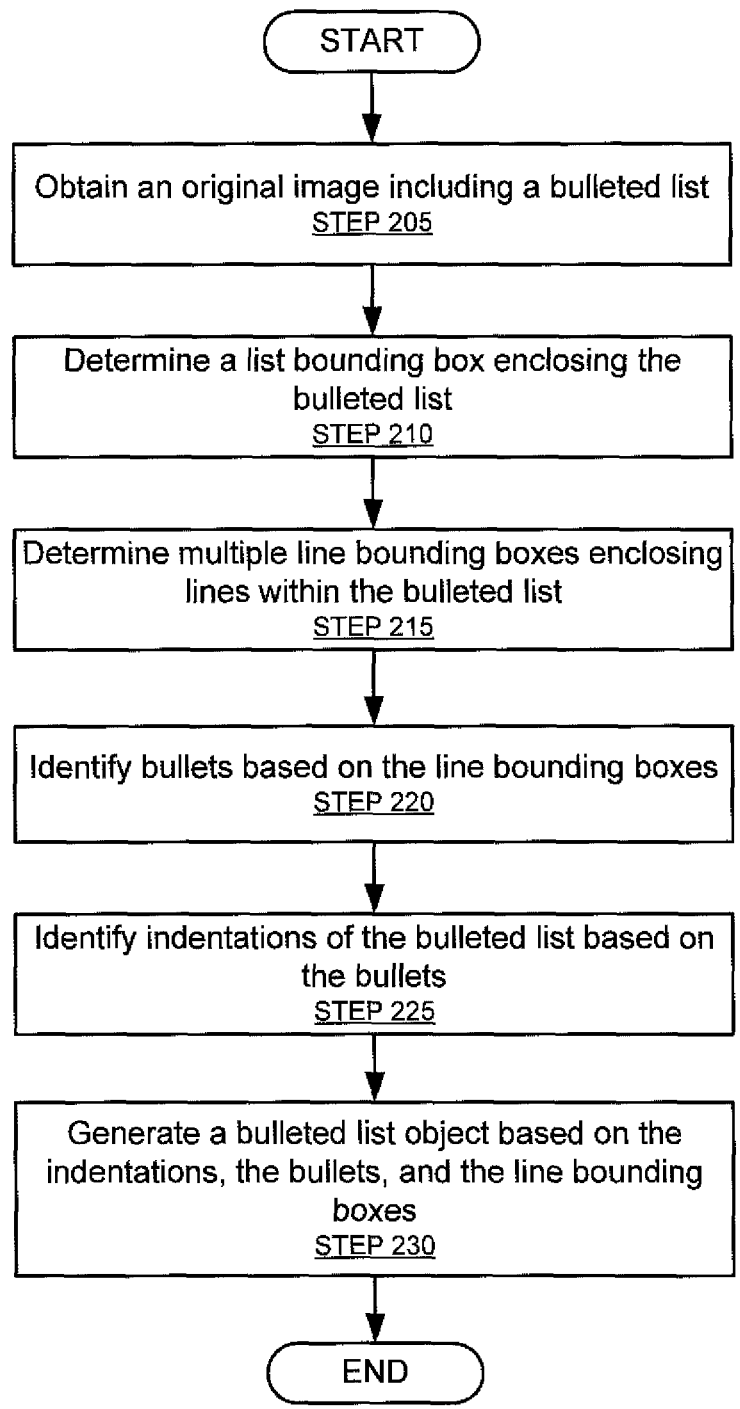
FIGS. 2-6 show flowcharts in accordance with one or more embodiments of the invention.

FIG. 2 shows a flowchart in accordance with one or more embodiments of the invention. The flowchart depicts a process for image processing. One or more of the steps in FIG. 2 may be performed by the components (108, 110, 114, 116) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an original image is obtained (STEP 205). The original image may be obtained from a digital camera or from a scanner. The original image may be downloaded from a server. The original image may include one or more bulleted lists. Each bulleted list may be hand-drawn or machine printed. As discussed above, a bulleted list is a list that uses a bullet (i.e., a symbol or glyph) to introduce items of the list. A bulleted list may have a hierarchy, with different levels of the bulleted list having different types of bullets positioned at different indentations.

In STEP 210, a list bounding box is determined for each bulleted list in the original image. Each list bounding box is a rectangular perimeter enclosing the bulleted list. Accordingly, each list bounding box has a position (i.e., coordinates) and dimensions. The process for determining a list bounding box is discussed below with respect to FIG. 3.

In STEP 215, a line bounding box is determined for each line within a bulleted list. Each list bounding box is a rectangular perimeter enclosing a line in a bulleted list. Depending on whether the line includes a bullet, the line bounding box may include a bullet. Multiple line bounding boxes may be nested within a single list bounding box. Each line bounding box has a position (i.e., coordinates) and dimensions. The process for determining a line bounding box is discussed below with respect to FIG. 4.

In STEP 220, multiple bullets are identified based on the line bounding boxes. Each bullet (i.e., a symbol or glyph) is used to introduce items of the list. Identifying bullets may include first identifying the starting intra-line bounding box and the one or more intermediate intra-line bounding boxes for each line bounding box. Then, a bullet may be identified based on a dimension of the starting intra-line bounding box and/or spacing between the starting intra-bounding box and the adjacent intermediate intra-line bounding box. The process for identifying bullets is discussed below with reference to FIG. 5.

In STEP 225, the indentations of the list are identified. As discussed above, a bulleted list may have a hierarchy, with different levels of the bulleted list having different types of bullets positioned at different indentations. The horizontal positions of the starting intra-line bounding boxes may be used to identify the indentations of the bullets, and thus the levels of the bulleted list. In one or more embodiments, multiple horizontal positions that are close (i.e., within a predetermined distance of each other) may be merged into a single indentation. The process for identifying indentations, and thus the levels of the bulleted list, is discussed below with reference to FIG. 6.

In STEP 230, a bulleted list object is generated. The bulleted list object represents the bulleted list in the original image. The bulleted list object may be included in an ED for distribution, easy editing (e.g., addition or removal of items, addition or removal of hierarchical levels, etc.), and rendering (i.e., printing, displaying, etc.). The bulleted list object may be specified using tags with attributes that are set based on the bullets, the indentations, the hierarchy, and the content (i.e., text characters) of the line bounding boxes, etc. The bulleted list object preservers the structure (e.g., hierarchy) of the bulleted list.

In one or more embodiments, generating the bulleted list object may include performing optical character recognition (OCR) or additional image processing on the regions of the original image enclosed by line bounding boxes in order to extract the content (i.e., text characters) of the bulleted list. In one or more embodiments, in the event it is difficult to extract the text characters in a line of the bulleted list, an image of just the content of a line ("line image") may be included in the bulleted list object. This line image may be displayed or printed when the bulleted list object is rendered. Moreover, the line image may be positioned to maintain the structure of the bulleted list.

Figure 3:
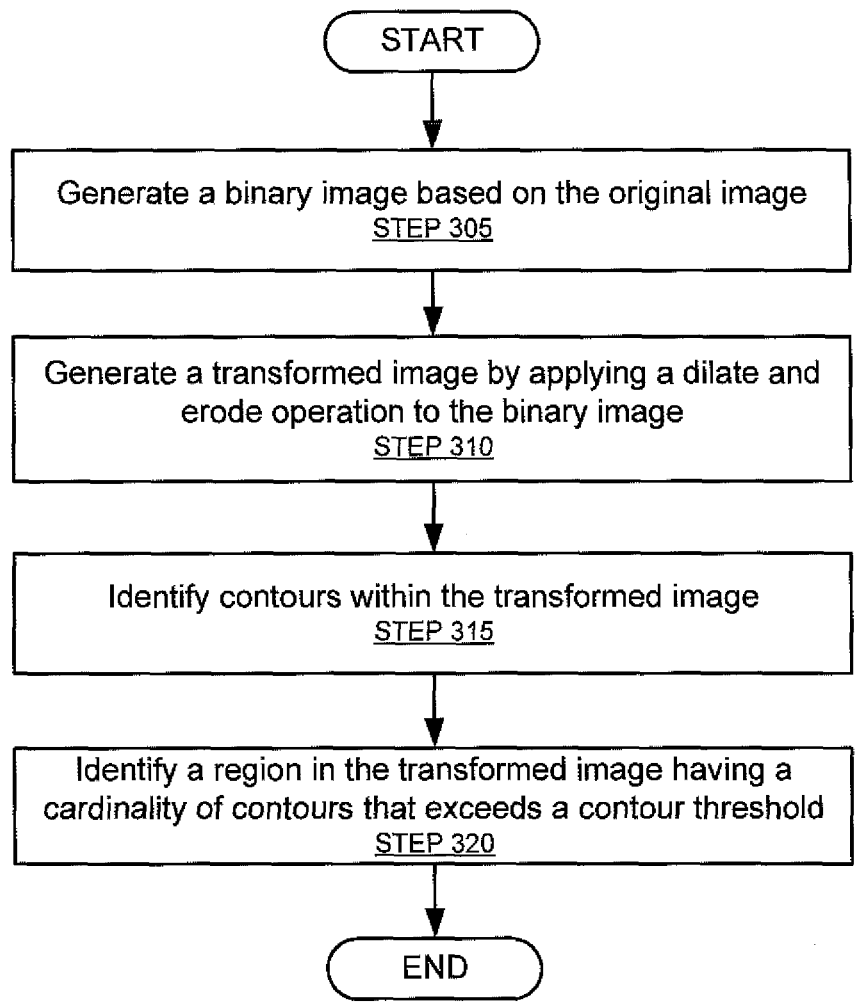

FIG. 3 shows a flowchart in accordance with one or more embodiments of the invention. The flowchart depicts a process for determining one or more list bounding boxes within an original image. One or more of the steps in FIG. 3 may be performed by the bounding box generator (114), discussed above in reference to FIG. 1. Further, one or more of the steps in FIG. 3 may correspond to STEP 210 in FIG. 2. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, a binary image is generated based on the original image (STEP 305). This step may include converting the original image to a greyscale image. Further, this step may include generating a gradient image by applying a Sobel operator to the greyscale image. Those skilled in the art, having the benefit of this detailed description, will appreciate that by applying the Sobel operator to the greyscale image, the horizontal and vertical gradients of the greyscale image are determined. Further still, this step may also include applying a thresholding operation to the gradient image to generate the binary image.

In STEP 310, a transformed image is generated by applying a dilate and erode (DE) operation to the binary image in order to close regions between close components in the image (e.g., text characters). Those skilled in the art, having the benefit of this detailed description, will appreciate that the DE operation is an example of a morphological operation. The DE operation applies a user specified structuring element to the binary image, creating the transformed image of the same size. The value of each pixel in the transformed image is based on a comparison of the corresponding pixel in the binary image with its neighbors.

Those skilled in the art, having the benefit of this detailed description, will also appreciate that dilation adds pixels to the boundaries of objects in the binary image, while erosion removes pixels on object boundaries. The number of pixels added to or removed from the objects in the binary image depends on the size and shape of the structuring element used to process the binary image, the number of dilate iterations, and the number of erode iterations.

In STEP 315, contours within the transformed image are identified. Various techniques may be used to identify the contours of the transformed image including, for example, differential contour detectors, phase congruency contour detectors, Saliency contour detectors, etc.

In STEP 320, at least one region within the transformed image having a cardinality of contours that exceeds a contour threshold is identified. For example, the contour threshold may be 1000 contours. Moreover, the region may be rectangular in shape. The perimeter of the region corresponds to a list bounding box.

Those skilled in the art, having the benefit of this detailed description, will appreciate that following execution of the process in FIG. 3, one or more list bounding boxes are determined. Each list bounding box encloses a bulleted list in the original image.

Figure 4:
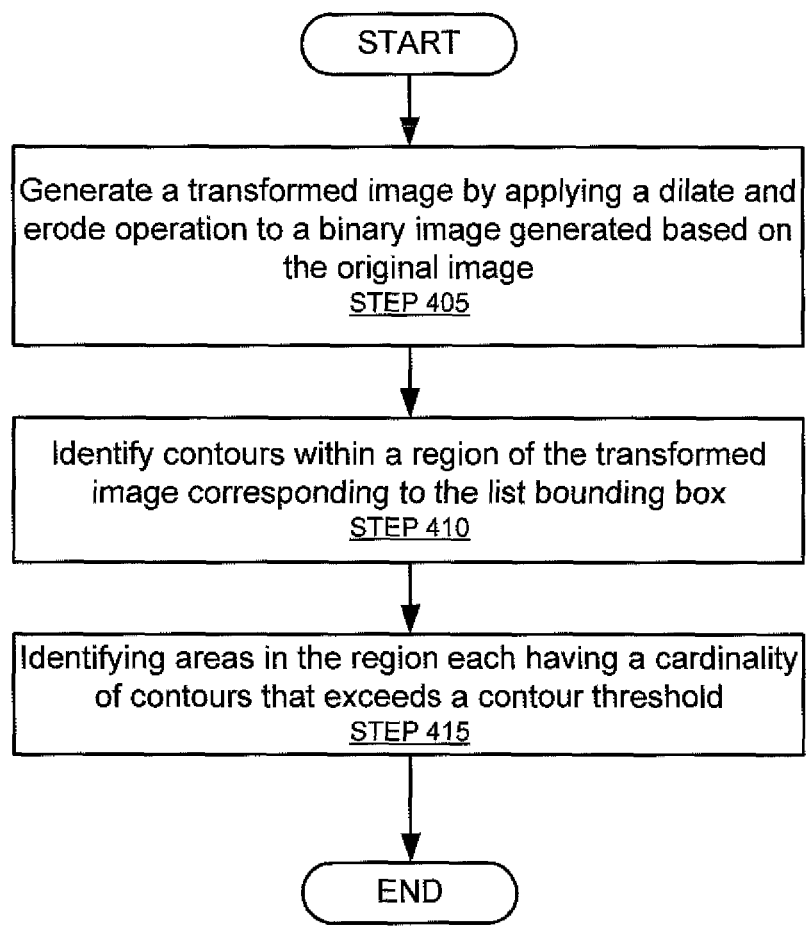

FIG. 4 shows a flowchart in accordance with one or more embodiments of the invention. The flowchart depicts a process for determining one or more line bounding boxes. One or more of the steps in FIG. 4 may be performed by the bounding box generator (114), discussed above in reference to FIG. 1. Further, one or more of the steps in FIG. 4 may correspond to STEP 215 in FIG. 2. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, a transformed image is generated by applying a DE operation to a binary image (STEP 405). The binary image is generated based on the original image. The binary image may be the same as the binary image in STEP 305. Alternatively, the binary image of STEP 405 may be generated using a different gradient operator and/or a different thresholding operation. In addition, the DE operation in STEP 405 may be similar to the DE operation in STEP 310, except a smaller structuring element may be used. The DE operation in STEP 405 may be applied to the entire binary image. Additionally or alternatively, the DE operation may only be applied to portions of the binary image enclosed by the determined list bounding boxes. Like before, the DE operation closes regions between close components (e.g., text characters) in the binary image.

In STEP 410, contours within the transformed image are identified. Specifically, contours within the portions of the transformed image enclosed by the determined list bounding boxes are identified. The contour detection technique may be the same as or different from the contour detection technique used in STEP 315.

In STEP 415, at least one area is identified within each region enclosed by a list bounding box. Specifically, the area may be rectangular in shape and include a cardinality of contours that exceeds a contour threshold. The contour threshold may be 100 contours. Moreover, the perimeter of the area corresponds to a line bounding box.

Those skilled in the art, having the benefit of this detailed description, will appreciate that following execution of the process in FIG. 4, multiple line bounding boxes nested with each list bounding box have been determined. Moreover, each line bounding box corresponds to a line of a bulleted list in the original image.

Figure 5:
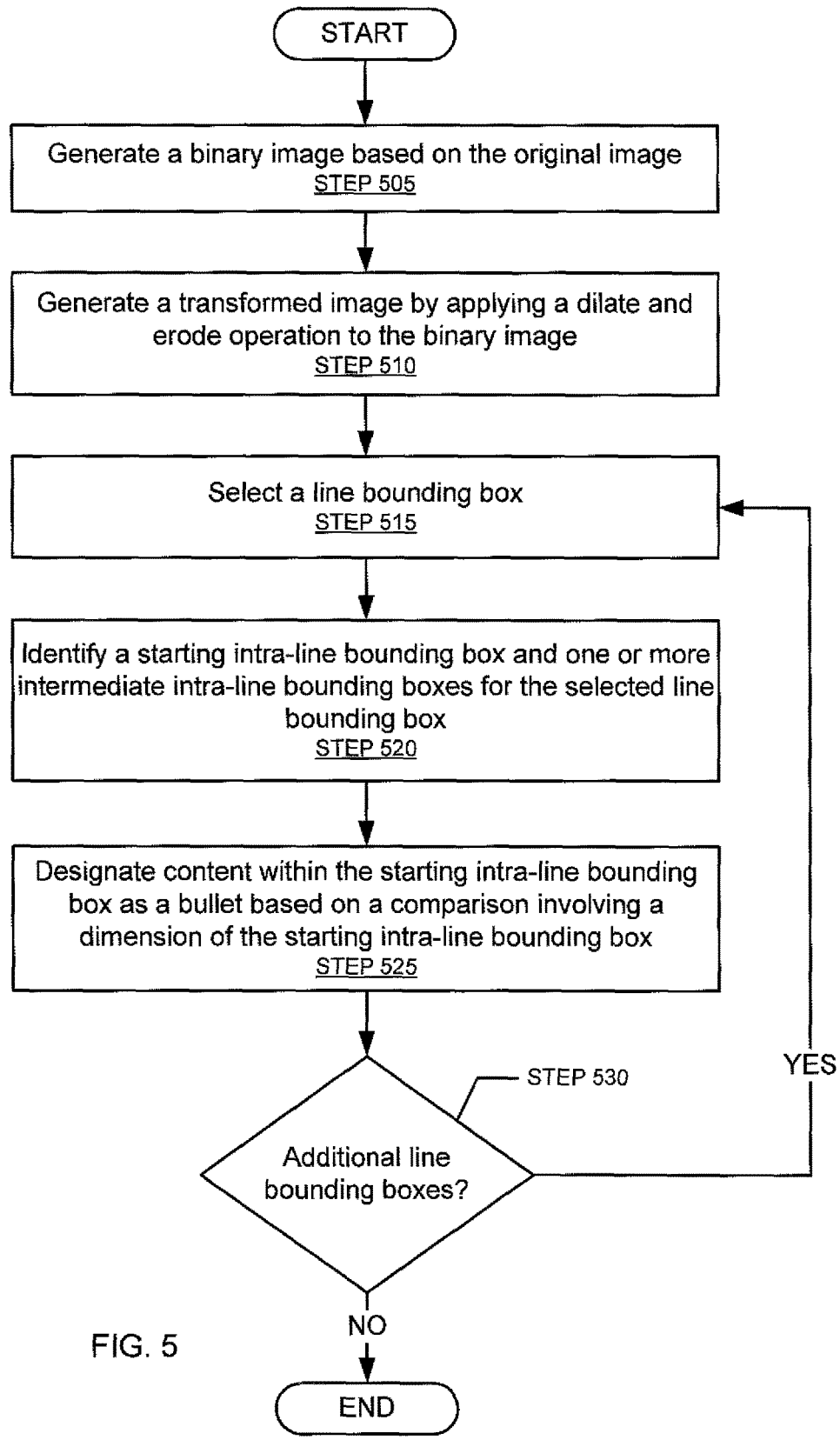

FIG. 5 shows a flowchart in accordance with one or more embodiments of the invention. The flowchart depicts a process for identifying bullets in a bulleted list. One or more of the steps in FIG. 5 may be performed by the bullet locator (116), discussed above in reference to FIG. 1. Further, one or more of the steps in FIG. 5 may correspond to STEP 220 in FIG. 2. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, a binary image based on the original image is generated (STEP 505). The binary image may be generated by first converting the original image to a greyscale image. Then, a blurring operation may be applied to the greyscale image followed by a thresholding operation to generate the binary image. The blurring operation may be applied to the entire greyscale image. Additionally or alternatively, the blurring may only be applied to the portions of the grey scale image enclosed by a line bounding box.

In STEP 510, a transformed image is generated by applying a DE operation to the binary image. The DE operation of STEP 510 may be similar to the DE operation in STEP 405. However, the DE operation of STEP 510 may have more dilate iterations than erode iterations. For example, there may be twice as many dilate iterations than erode iterations. This DE operation may effectively merge characters within a single word.

In STEP 515, one of the previously determined line bounding boxes is selected. The line bounding box may be selected at random. Additionally or alternatively, the selected line bounding box may correspond to the first line bounding box or the last line bounding box determined for the image.

In STEP 520, a starting intra-line bounding box and one or more intermediate intra-line bonding boxes are identified for the selected line bounding box. Both the starting and intermediate intra-line bounding boxes correspond to areas within the selected line bounding box having a cardinality of contours that exceeds a contour threshold. If the areas are sorted based on horizontal position, the first area following the sort is the stating intra-line bounding box. The remaining areas are intermediate intra-line bounding boxes. The starting intra-line bounding box may contain the bullet for the selected line bounding box, if a bullet exists. Alternatively, the starting intra-line bounding box may contain the first word in the selected line bounding box.

In STEP 525, the content within the starting intra-line bounding box is designated a bullet based on a comparison involving a dimension of the starting intra-line bounding box. For example, if the height of the starting intra-line bounding box is less than half the height of the selected line bounding box, the content of the starting intra-line bounding box is deemed to be a bullet. As another example, if the horizontal spacing between the starting intra-line bounding box and the adjacent intermediate bounding box is at least twice the width of the starting intra-line bounding box, then the content of the starting intra-line bounding box is deemed to be a bullet. As discussed above, some lines might not have bullets. In such scenarios, the starting intra-line bounding box encloses the first word (i.e., plain text) in the selected line bounding box.

In STEP 530, it is determined whether additional line bounding boxes exist that have not yet been selected. When such line bounding boxes do exist, the process returns to STEP 515. Alternatively, the process may end.

Those skilled in the art, having the benefit of this detailed description, will appreciate that following execution of the process in FIG. 5, the starting intra-line bounding boxes containing bullets have been identified. Moreover, each of these starting intra-line bounding boxes has a position (i.e., coordinates). Further still, the bullets have been identified without or before performing text character recognition (e.g., OCR).

Figure 6:
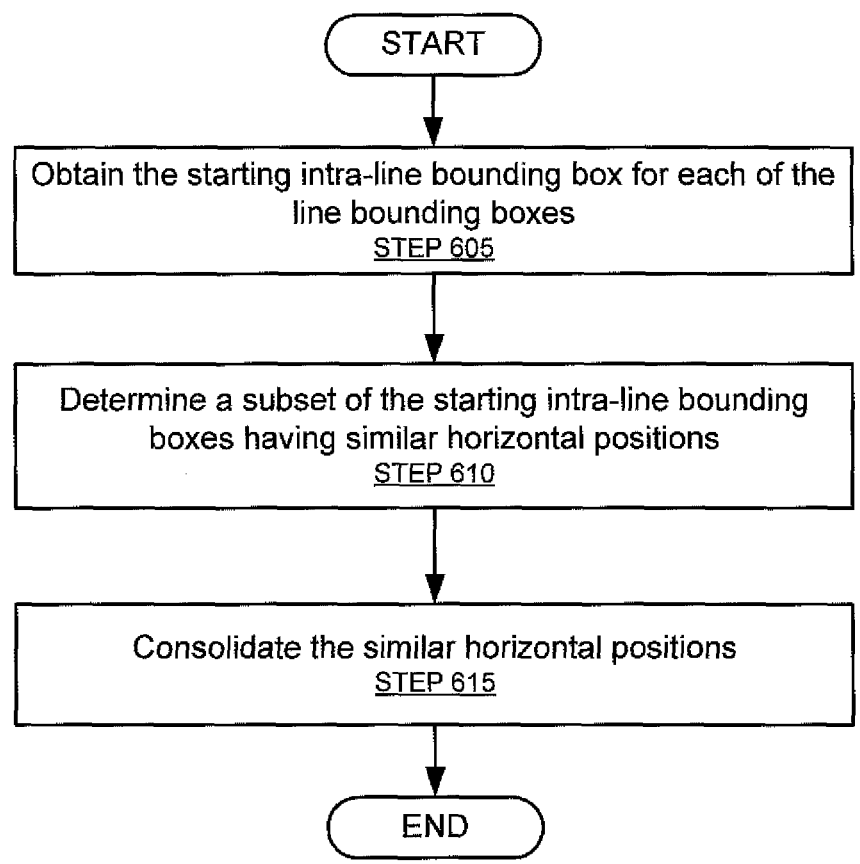

FIG. 6 shows a flowchart in accordance with one or more embodiments of the invention. The flowchart depicts a process for identifying indentations in a bulleted list and thus the levels of the bulleted list. One or more of the steps in FIG. 6 may be performed by the list hierarchy engine (110), discussed above in reference to FIG. 1. Further, one or more of the steps in FIG. 6 may correspond to STEP 225 in FIG. 2. In one or more embodiments of the invention, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6.

Initially, each starting intra-line bounding box deemed to contain a bullet is obtained (STEP 605). As discussed above, there may be one starting intra-line bounding box for each line bounding box in a bulleted list. The content of some of the starting intra-line bounding boxes may be a bullet. As also discussed above, each starting intra-line bounding box has a position (e.g., coordinates). The horizontal position of each bullet (i.e., the horizontal position of a starting intra-line bounding box containing a bullet) may correspond to an indentation of the bulleted list.

In STEP 610, a subset of starting intra-line bounding boxes having similar horizontal positions is determined. As discussed above, a bulleted list may have a hierarchy, with different levels of the bulleted list using different types of bullets positioned at different indentations. In theory, if two bullets have different horizontal positions, each bullet corresponds to a different level of the bulleted list. However, because the bulleted list may be hand-drawn, there may be slight horizontal offsets between bullets that actually belong to the same level. In one or more embodiments, similar horizontal positions means the two bullets are within a predetermined distance of each other. In one or more embodiments, the predetermined distance is half the average height of the line bounding boxes nested with the list bounding box.

In STEP 615, the similar horizontal positions are consolidated. In other words, the closely spaced indentations are merged/collapsed into a single indentation value. For example, the single indentation value may be the average of the similar horizontal positions. As another example, the single indentation value may be smallest value or the largest value of the similar horizontal positions. The existence of the indentations and the indentation values are used to determine the structure of the bulleted list, and thus may be used to generate the bulleted list object.

Figure 7A:
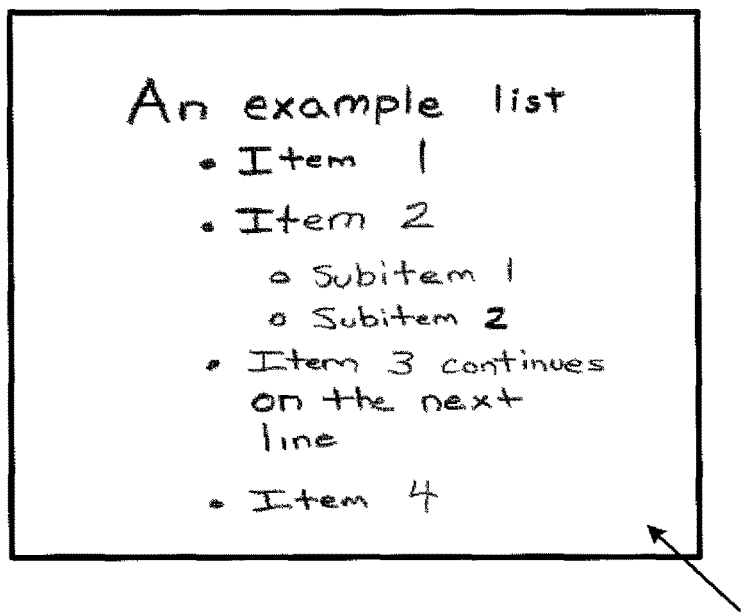
FIGS. 7A-7D show an implementation example in accordance with one or more embodiments of the invention.

FIGS. 7A-7D show an implementation example in accordance with one or more embodiments of the invention. As shown in FIG. 7A, there exists an original image (702). The original image (702) has a bulleted list that is hand-drawn. Each item or sub-item is introduced with a bullet. As also shown in FIG. 7A, the bulleted-list has a hierarchy, with different levels of the buffeted list using different types of bullets positioned at different indentations.

Figure 7B:
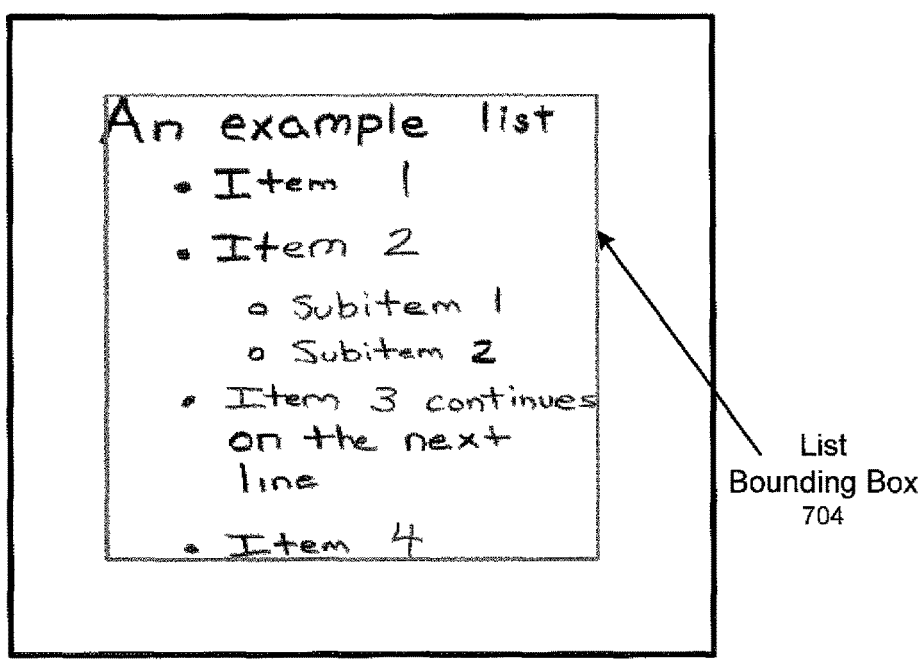

FIG. 7B shows a list bounding box (704) determined for the bulleted-list. The list bounding box (704) may be determined using the bounding box generator (114) and the process shown in FIG. 3. As shown in FIG. 7B, the list bounding box (704) encloses the bulleted list.

Figure 7C:
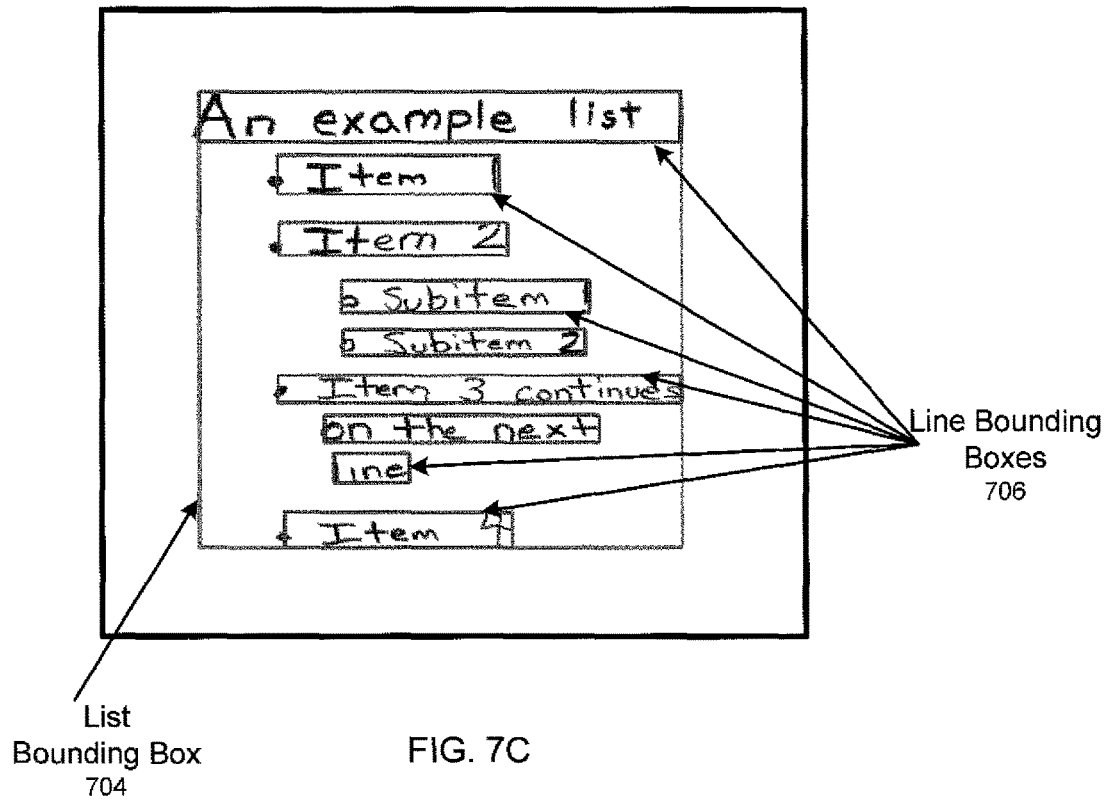

FIG. 7C shows multiple line bounding boxes (706). The line bounding boxes (704) may be determined using the bounding box generator (114) and the process shown in FIG. 4. All of the line bounding boxes (706) are nested with the list bounding box (704). As shown in FIG. 7C, some line bounding boxes include bullets. However, some line bounding boxes do not have a bullet.

Figure 7D:
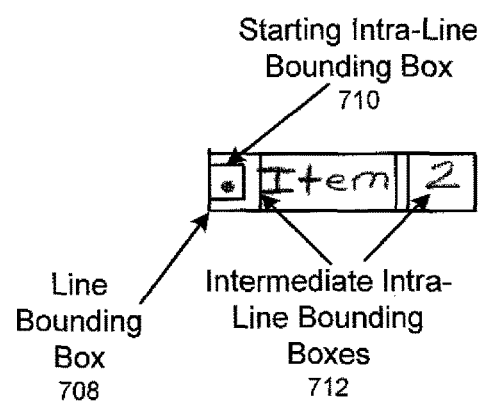

FIG. 7D shows a selected line bounding box (708). A starting intra-line bounding box (710) and multiple intermediate intra-line bounding boxes (712) have been identified within the selected line bounding box (708). The intra-line bounding boxes (710, 712) may be identified using the bullet locator (116) and the process shown in FIG. 5. The starting intra-line bounding box (710) includes a bullet. The intermediate intra-line bounding boxes (712, 714) contain text characters.

One or more embodiments of the invention may have the following advantages: the ability to identify bulleted lists in an original image; the ability to identify lines within a bulleted list; the ability to identify bullets and indentations (i.e., levels) within a bulleted list; the ability to identify bullets and indentations without first performing text character recognition (e.g., OCR); the ability to process hand-drawn bulleted list and consolidate bullets actually belonging to the same level despite having horizontal offsets; the ability to generate a bulleted list object that can be included in an ED for distribution; the ability to generate a bulleted list object that preserves the structure of the bulleted list and that can be easily modified; etc.

Figure 8:
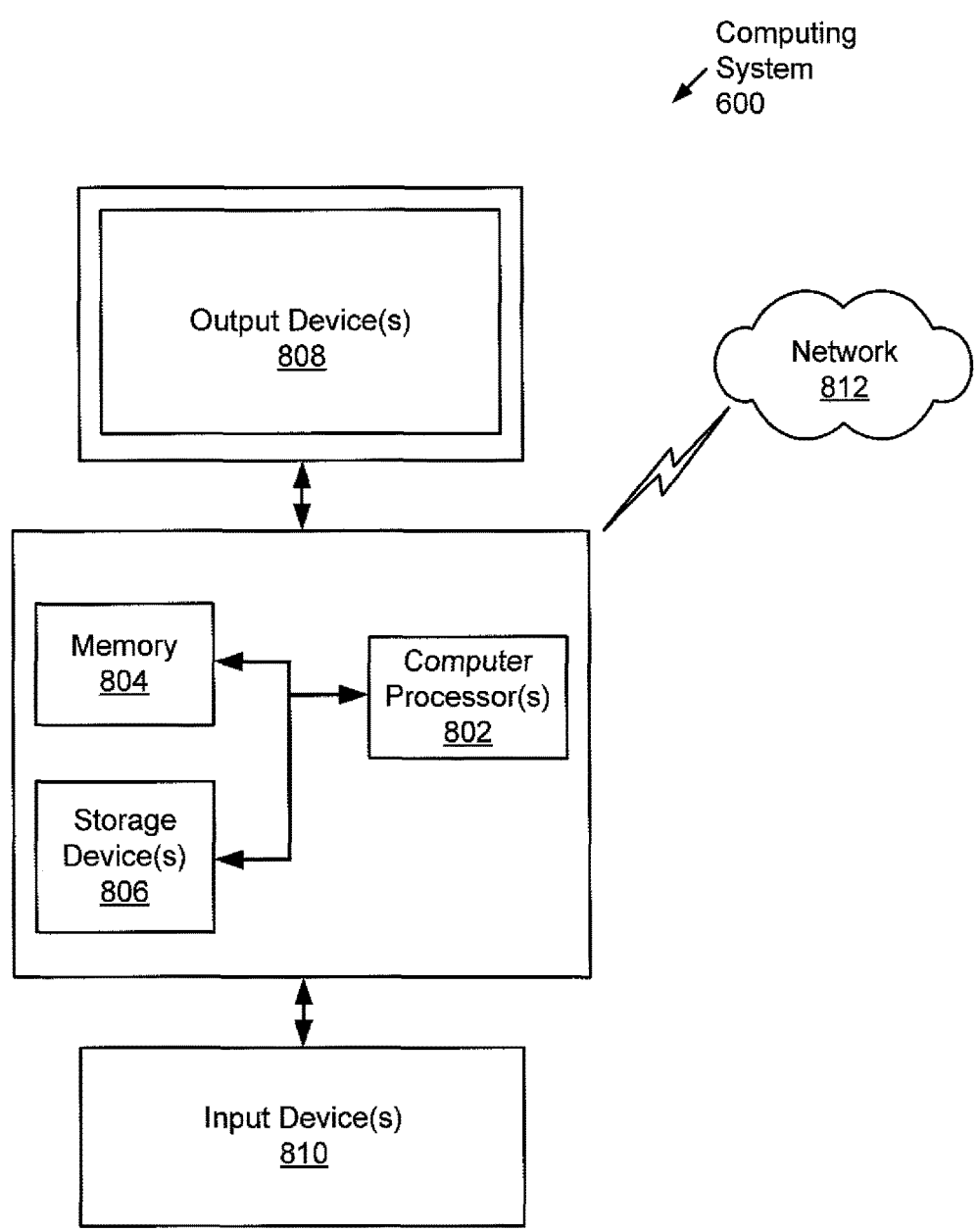
FIG. 8 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (800) may be located at a remote location and connected to the other elements over a network (812). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
obtaining an original image comprising a bulleted list;
determining a list bounding box enclosing the bulleted list by:
generating a first binary image based on the original image;
generating a first transformed image by applying a first dilate and erode (DE) operation comprising a first structuring element to the first binary image;
identifying a first plurality of contours in the first transformed image; and
identifying a region in the transformed image comprising a first cardinality of contours that exceeds a first contour threshold;
determining a plurality of line bounding boxes nested within the list bounding box enclosing a plurality of lines of the bulleted list;

identifying a plurality of bullets based on the plurality of line bounding boxes;
identifying a plurality of indentations based on the plurality of bullets; and
generating a bulleted list object for the bulleted list in the original image based on the plurality of indentations.

2. The method of claim 1, wherein generating the first binary image comprises:
generating a gradient image for the original image; and
applying a thresholding operation to the gradient image.

3. The method of claim 1, wherein determining the plurality of line bounding boxes comprises:
generating a second transformed image by applying a second dilate and erode (DE) operation comprising a second structuring element to the first binary image, wherein the second structuring element is smaller than the first structuring element;
identifying a second plurality of contours in a region of the second transformed image corresponding to the list bounding box; and
identifying an area in the region of the second transformed image comprising a second cardinality of contours that exceeds a second contour threshold.

4. The method of claim 1, wherein identifying the plurality of bullets comprises:
generating a transformed image by applying a dilate and erode (DE) operation comprising a number of dilate iterations and a number of erode iterations to at least one selected from a group consisting of the first binary image and a second binary image generated from the original image, wherein the number of dilate iterations exceeds the number of erode operations;
selecting a line bounding box of the plurality of line bounding boxes;
identifying a starting intra-line bounding box and an intermediate intra-line bounding box for the line bounding box; and
designating content within the starting intra-line bounding box as a bullet based on a comparison comprising a dimension of the starting intra-line bounding box.

5. The method of claim 4, wherein the dimension is a height of the starting intra-line bounding box, and wherein the comparison is between the dimension and half the height of the line bounding box.

6. The method of claim 4, wherein the dimension is half of the width of the starting intra-line bounding box, and wherein the comparison is between the dimension and a spacing between the starting intra-line bounding box and the intermediate intra-line bounding box.

7. The method of claim 1, wherein identifying the plurality of indentations comprises:
obtaining a plurality of starting intra-line bounding boxes comprising a plurality of horizontal positions;
determining a subset of the plurality of horizontal positions are within a predetermined distance of each other; and
consolidating the subset of the plurality of horizontal positions.

8. A non-transitory computer readable medium (CRM) storing computer readable program code embodied therein that:
obtains an original image comprising a bulleted list;
determines a list bounding box enclosing the bulleted list by:
generating a first binary image based on the original image;
generating a first transformed image by applying a first dilate and erode (DE) operation comprising a first structuring element to the first binary image;
identifying a first plurality of contours in the first transformed image; and
identifying a region in the transformed image comprising a first cardinality of contours that exceeds a first contour threshold;
determines a plurality of line bounding boxes nested within the list bounding box enclosing a plurality of lines of the bulleted list;
identifies a plurality of bullets based on the plurality of line bounding boxes;
identifies a plurality of indentations based on the plurality of bullets; and
generates a bulleted list object for the bulleted list in the original image based on the plurality of indentations.

9. The non-transitory CRM of claim 8, wherein determining the plurality of line bounding boxes comprises:
generating a second transformed image by applying a second dilate and erode (DE) operation comprising a second structuring element to the first binary image, wherein the second structuring element is smaller than the first structuring element;
identifying a second plurality of contours in a region of the second transformed image corresponding to the list bounding box; and
identifying an area in the region of the second transformed image comprising a second cardinality of contours that exceeds a second contour threshold.

10. The non-transitory CRM of claim 8, wherein identifying the plurality of bullets comprises:
generating a transformed image by applying a dilate and erode (DE) operation comprising a number of dilate iterations and a number of erode iterations to at least one selected from a group consisting of the first binary image and a second binary image generated from the original image, wherein the number of dilate iterations exceeds the number of erode operations;
selecting a line bounding box of the plurality of line bounding boxes;
identifying a starting intra-line bounding box and an intermediate intra-line bounding box for the line bounding box; and
designating content within the starting intra-line bounding box as a bullet based on a comparison comprising a dimension of the starting intra-line bounding box.

11. The non-transitory CRM of claim 10, wherein the dimension is a height of the starting intra-line bounding box, and wherein the comparison is between the dimension and half the height of the line bounding box.

12. The non-transitory CRM of claim 10, wherein the dimension is half of the width of the starting intra-line bounding box, and wherein the comparison is between the dimension and a spacing between the starting intra-line bounding box and the intermediate intra-line bounding box.

13. The non-transitory CRM of claim 8, wherein identifying the plurality of indentations comprises:
obtaining a plurality of starting intra-line bounding boxes comprising a plurality of horizontal positions;
determining a subset of the plurality of horizontal positions are within a predetermined distance of each other; and
consolidating the subset of the plurality of horizontal positions.

14. A system for image processing, comprising:
a memory; and a computer processor connected to the memory that:
   determines a list bounding box enclosing the bulleted list by:
      generating a first binary image based on the original image;
      generating a first transformed image by applying a first dilate and erode (DE) operation comprising a first structuring element to the first binary image;
      identifying a first plurality of contours in the first transformed image; and
      identifying a region in the transformed image comprising a first cardinality of contours that exceeds a first contour threshold;
   determines a plurality of line bounding boxes nested within the list bounding box enclosing a plurality of lines of the bulleted list;
   identifies a plurality of bullets based on the plurality of line bounding boxes;
   identifies a plurality of indentations based on the plurality of bullets; and
   generates a bulleted list object for the bulleted list in the original image based on the plurality of indentations.

15. The system of claim 14, wherein the bounding box generator determines determining the plurality of line bounding boxes comprises:
   generating a second transformed image by applying a second dilate and erode (DE) operation comprising a second structuring element to the first binary image, wherein the second structuring element is smaller than the first structuring element;
   identifying a second plurality of contours in a region of the second transformed image corresponding to the list bounding box; and
   identifying an area in the region of the second transformed image comprising a second cardinality of contours that exceeds a second contour threshold.

16. The system of claim 14, wherein identifying the plurality of bullets comprises:
   generating a transformed image by applying a dilate and erode (DE) operation comprising a number of dilate iterations and a number of erode iterations to at least one selected from a group consisting of the first binary image and a second binary image generated from the original image, wherein the number of dilate iterations exceeds the number of erode operations;
   selecting a line bounding box of the plurality of line bounding boxes;
   identifying a starting intra-line bounding box and an intermediate intra-line bounding box for the line bounding box; and
   designating content within the starting intra-line bounding box as a bullet based on a comparison comprising a dimension of the starting intra-line bounding box.

17. The system of claim 14, wherein identifying the plurality of indentations comprises:
   obtaining a plurality of starting intra-line bounding boxes comprising a plurality of horizontal positions;
   determining a subset of the plurality of horizontal positions are within a predetermined distance of each other; and
   consolidating the subset of the plurality of horizontal positions.

* * * * *